United States Patent [19]

Fleming

[11] 4,037,925

[45] July 26, 1977

[54] REFLECTOR ASSEMBLY

[75] Inventor: Robert S. Fleming, Pompton Plains, N.J.

[73] Assignee: Amerace Corporation, New York, N.Y.

[21] Appl. No.: 634,305

[22] Filed: Nov. 21, 1977

[51] Int. Cl.$^2$ .............................................. G02B 5/12
[52] U.S. Cl. ................ 350/97; 301/37 SA; 350/99
[58] Field of Search ............... 350/99, 102, 106, 107; 301/37 SA, 37 R; 85/21, 32; 40/129; 401/29 B

[56] References Cited

U.S. PATENT DOCUMENTS

| 278,230 | 5/1983 | Fairlamb | 85/32 R |
|---|---|---|---|
| 3,461,772 | 8/1969 | Barry | 85/21 |
| 3,530,921 | 9/1970 | Ernest | 85/21 |
| 3,820,852 | 6/1974 | Kennedy | 301/37 SA |
| 3,834,438 | 9/1974 | Ziaylek, Jr. | 85/21 |
| 3,854,777 | 12/1974 | Kennedy | 301/37 SA |

FOREIGN PATENT DOCUMENTS 460,300  1/1937  United Kingdom ............... 350/106

*Primary Examiner*—John K. Corbin
*Assistant Examiner*—B. W. delos Reyes
*Attorney, Agent, or Firm*—S. Michael Bender; Ken Richardson

[57] ABSTRACT

A reflector assembly is provided for mounting on a spoked wheel such as, for example, a bicycle wheel. The assembly comprises a plate-like reflector and a fastener apparatus for securing the reflector to the wheel. The reflector includes a central aperture extending through the thickness of the reflector and a transversely extending groove on one side of the reflector which intersects the central aperture. The reflector is mounted on and secured to a spoke received within the transversely extending groove by the fastener apparatus which includes a fastening element and a binding screw, each of which are inserted into the central aperture from opposite ends thereof and, upon engagement of the fastening element and the binding screw, serve to secure the reflector to the spoke.

12 Claims, 4 Drawing Figures

U.S. Patent   July 26, 1977   4,037,925
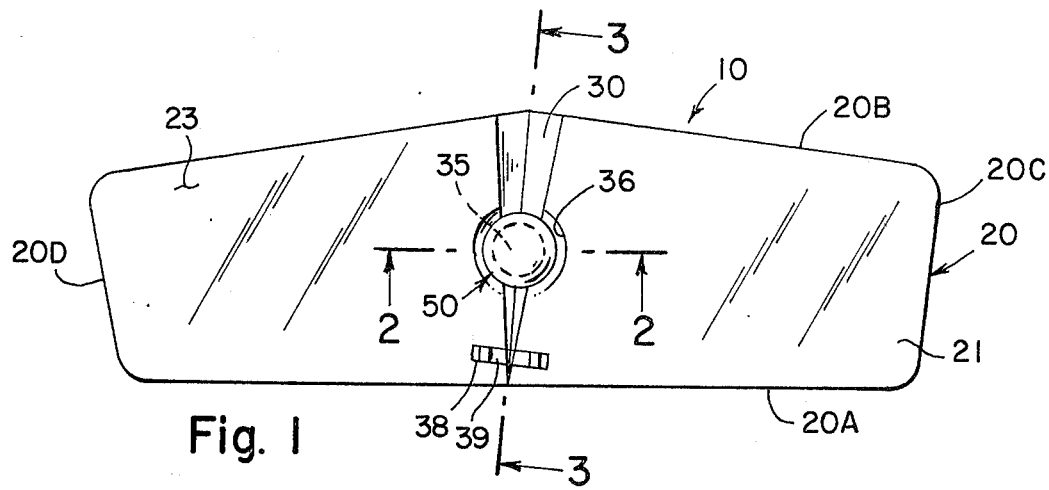
Fig. 1
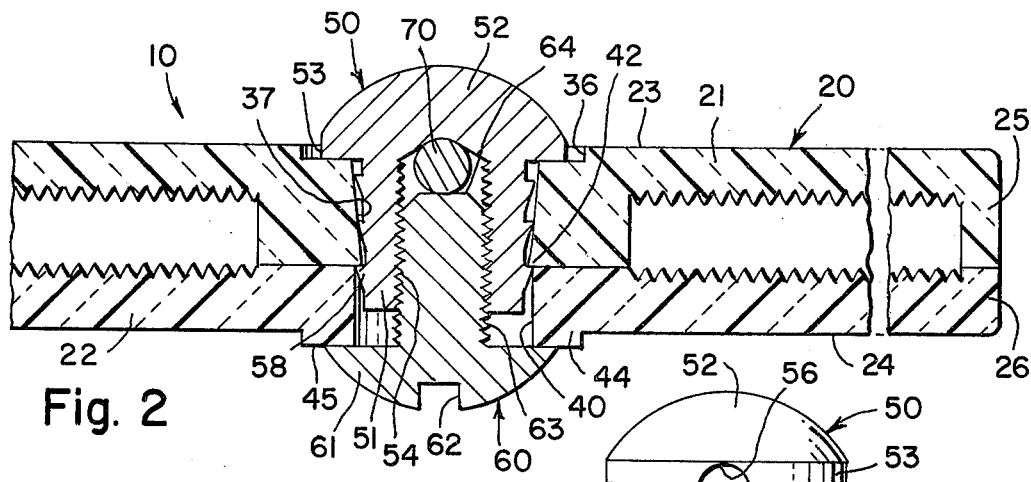
Fig. 2
Fig. 4
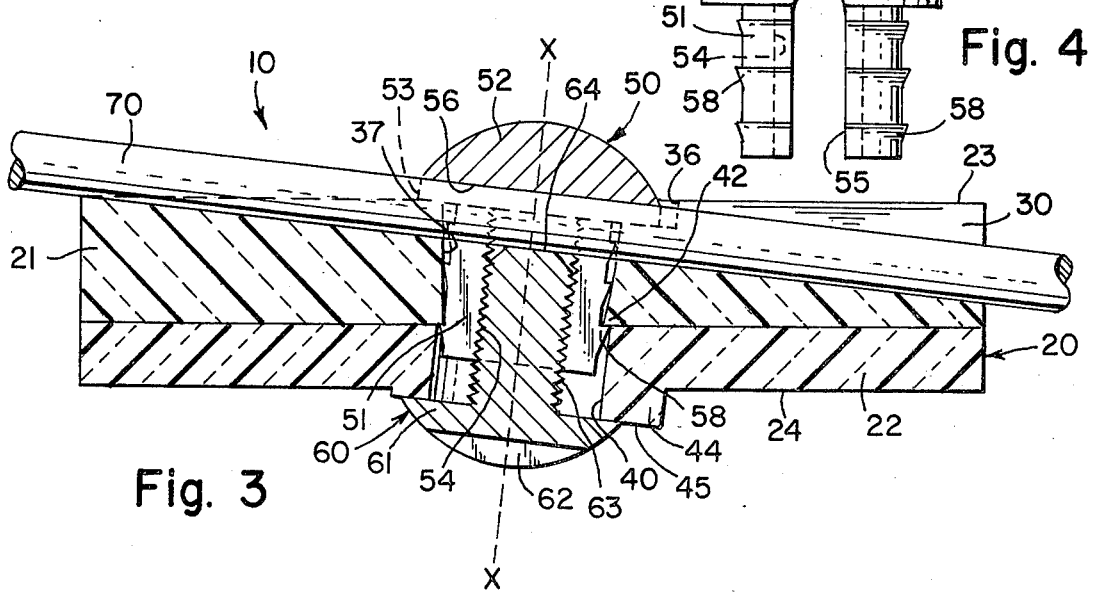
Fig. 3

REFLECTOR ASSEMBLY

BACKGROUND OF THE INVENTION

This invention relates generally to a reflector assembly adapted to be mounted on spoked wheels such as, for example, bicycle wheels and, more particularly, to a reflector assembly which may be mounted on a bicycle wheel by attachment to one or more of its spokes.

Current Consumer Product Federal Specifications require that each wheel of a bicycle be visible in response to light from an oncoming motor vehicle. Most bicycle manufacturers, in an effort to comply with these specifications, have mounted one or more reflector devices on the spokes of each bicycle wheel. These specifications further require that when spoke reflectors are used, they are secured in such a manner that they will be maintained in proper alignment during use. For example, the regulations identify the minimum acceptable specific intensity of the reflectors at specific angles, i.e., 30°, 40° and 50°, with respect to and on either side of a normal to the front surface of the reflector.

In order to insure that proper alignment is maintained during use, it is imperative that reliable reflector fastening means be provided. Further, it is preferred that the reflector be easily detached so as to minimize the possibility of theft and/or loss. The reflector assembly should further be relatively inexpensive so that its inclusion does not add unduly to the cost of the bicycle or replacement parts therefor.

Additionally, the reflector assembly must be capable of being mounted on virtually any bicycle wheel. It will, of course, be readily appreciated that although most bicycle wheels possess the same basic components, i.e., a hub, a rim and spokes interconnecting the hub and the rim, the spoke arrangement may, however, vary from wheel to wheel. It is important, therefore, that the reflector assembly be capable of accommodating the particular spoke arrangement of most bicycle wheels.

Heretofore, bicycle wheel spoke mounted reflectors have been employed which are adapted for direct, positive attachment to two or more spokes. Since the spacing between the wheel spokes may vary from bicycle to bicycle, these reflectors included adjustable latches which could accommodate various spoke arrangements. This adjustability feature, however, generally increases the manufacturing cost of the spoke reflectors. Further, these reflectors generally required a mounting frame or plate in order to add rigidity to the reflector assembly and to provide a surface upon which the adjustable latches could be mounted.

Still other bicycle wheel spoke mounted reflectors are known which include a simple nut and bolt or screw fastener means to facilitate mounting the reflector on a single spoke with the reflector body being further supported by being wedgingly engaged between the single spoke and its two immediately adjacent neighboring spokes. Such simple fastener means are easily detached and therefore are not as theft-proof or resistant to removal as would otherwise be desired.

Against the foregoing background, it is a primary object of the present invention to provide an improved reflector assembly for mounting on the spoked wheels of a bicycle.

Still another object of the present invention is to provide a reflector assembly including improved means for positively and directly mounting the reflector assembly to a single spoke of a spoked bicycle wheel.

It is yet still another object of the present invention to provide an improved reflector assembly for mounting on a spoked wheel of a bicycle which reflector assembly will be maintained in a predetermined orientation during use and which is not susceptible to being easily removed.

SUMMARY OF THE INVENTION

To the accomplishment of the foregoing objects and advantages, the present invention, in brief summary, comprises a reflector assembly which is adapted to be securably mounted to a spoked bicycle wheel. The reflector assembly comprises a plate-like reflector and a fastener apparatus. The plate-like reflector includes a central aperture which passes through the thickness of the reflector and a transversely extending groove on one side of the reflector which intersects the central aperture and which is adapted to receive a spoke of a bicycle wheel.

The fastener apparatus comprises a fastener element and a binding screw for use in mounting the plate-like reflector to the spoke of the wheel. The fastener element includes a head and an axially extending shank having a free end, said shank further having an internally threaded central bore axially extending from the free end of the shank toward the head. In addition, the shank is bifurcated to define a pair of diametrically opposed slots in the wall of the shank extending axially from the free or distal end of the shank toward the head of the shank, said slots defining an axially extending transverse opening in said element adapted to receive the spoke of the bicycle wheel transversely with respect to the longitudinal axis of said shank and its internally threaded bore. The binding screw which includes an enlarged head and an axially extending externally threaded shank portion is adapted to be threadedly engaged within the central bore of the bifurcated shank of the fastener element.

The fastener element is adapted to be inserted into the central aperture of the reflector from the one side thereof in such a manner that the diametrically opposed slots in the fastener element bifurcated shank are axially aligned with the spoke of the wheel which is positioned within the groove on the one side of the reflector. In this manner, as the fastener element is inserted into the aperture in the reflector, the spoke is received through the diametrically opposed slots in the fastener element shank and is retained therein between the bifurcated portions of the shank. The binding screw is then inserted into the central aperture of the reflector from the opposite side thereof and upon engagement of the internally threaded central bore of the shank portion of the fastener element with the externally threaded portion of the binding screw shank the spoke is positively retained within the fastener apparatus thus securing the reflector to the spoke of the bicycle wheel.

BRIEF DESCRIPTION OF THE DRAWINGS

The foregoing and still other objects and advantages of the present invention will be more apparent from the following detailed description of the preferred embodiment of the invention in connection with the accompanying drawings wherein:

FIG. 1 is a side view in elevation of the reflector assembly of the present invention;

FIG. 2 is an enlarged sectional view of a fragmentary portion of the reflector assembly of the present invention taken along line 2—2 of FIG. 1;

FIG. 3 is an enlarged sectional view of a fragmentary portion of the reflector assembly of the present invention taken along line 3—3 of FIG. 1; and FIG. 4 is a side view in elevation of the fastener element of the present invention shown in FIGS. 2 and 3.

DESCRIPTION OF THE PREFERRED EMBODIMENT

Referring now to FIG. 1, there is shown the reflector assembly of the present invention generally indicated by reference numeral 10. The reflector assembly 10 comprises an elongated, plate-like reflector 20, which as seen in FIGS. 2 and 3, includes two elongated plate-like members 21 and 22. The reflector 20 is a conventional reflector preferably a reflex reflector of the cube-corner type, with each member 21 and 22 being constructed of a transparent molded plastic material such as methyl methacrylate, for example, and preferably having a generally straight side edge 20A, an opposed v-shaped side edge 20B and two converging straight side edges 20C and 20D. The member 21 has a light receiving outer surface 23 which may be substantially flat and opposed edge portions 25. Similarly, the opposed member 22 has a light receiving outer surface 24 which may also be substantially flat and opposed edge portions 26. Preferably, the edge portion 25 of the reflector member 21 is continuously welded to the edge portion 26 of the reflector member 22, by conventional welding techniques such as, for example, ultrasonic welding. This produces an extremely rigid reflector 20 with the light receiving outer surfaces 23 and 24 of the reflector members 21 and 22 being in diametrically opposed alignment relative to each other.

As is well known in the art, the rear surfaces of members 21, 22 may include a plurality of retro-reflective elements 26, 28 (e.g. molded cube-corner formations) such that light incident upon surfaces 23, 24 passes through the members 21, 22 and is reflected back through the members 21, 22 by the retro-reflective elements.

A groove 30 included in the member 21 and opening into outer surface 23 extends transversely across the width of the reflector member 21 from the generally straight side edge 20A to the opposed v-shaped side 20B and at an oblique angle relative to a vertical axis (not shown) lying in the plane of the paper and perpendicular to the generally straight side edge 20A of the reflector 20. This oblique angle should correspond to the angle the spokes of a bicycle wheel commonly assume relative to a radial line extending from the rotation center of the wheel to and through the point on the rim where one end of the spoke is attached to the rim, and typically is on the order of about 5°. The width and depth of the groove 30 increases from the generally straight side edge 20A toward the opposed v-shaped side edge 20B with the slope of the base of the groove 30 being substantially the same as the inclination of the spoke of a bicycle wheel upon which it is to be mounted with reference to the plane of rotation of the bicycle wheel, e.g., 7°.

The reflector members 21 and 22 each include a center aperture 35 and 40, respectively, which passes through the thickness of members 21 and 22 and which are, when the members 21 and 22 are welded together, substantially coaxial about a common axis X—X (FIG. 3). The common axis X—X of center apertures 35 and 40 preferably is disposed perpendicular to the base of the groove 30 which latter is intersected by center aperture 35 as seen in FIGS. 1 and 3. The center aperture 35 of the reflector member 21, includes a counterbore portion 36 extending from the outer surface 23 of member 21 toward a further bore portion 37 which tapers inwardly as shown in FIGS. 2 and 3. The depth of the counterbore portion 36 is tapered relative to the outer surface 23 of member 21 in the direction of and at an angle approximately equal to the angle of the taper of the groove 30. The tapered bore portion 37 of the center aperture 35 which extends from the counterbore portion 36 to the center aperture 40 of the reflector member 22 is tapered from a larger diameter at the counterbore portion 36 to a smaller diameter at the point of intersection of the tapered bore portion 37 with center aperture 40 of the reflector element 22. The center aperture 40 of the reflector member 22 has a constant diameter approximately equal to the diameter of the larger diametered portion of the tapered bore portion 37 of center aperture 35. By this construction, an annular lip or shoulder 42 is provided at the juncture of center apertures 35 and 40.

A raised portion or boss 44 is provided on the outer surface 24 of the reflector member 22 through which center aperture 40 extends. The outwardly facing surface of boss 44 is tapered relative to the outer surface 24 of the reflector member 22 in the direction of and at an angle approximately equal to the angle of inclination or the slope of the base of groove 30 on the opposed outer surface 23 of the reflector member 21.

A raised bridge portion 38 with a v-shaped center portion 39 adapted to receive a spoke therein may be included proximal to the generally straight side 20A on the outer surface 23 of member 21. The bridge portion 38, which straddles the groove 30 and is generally perpendicular thereto is adapted to engage the spoke and provide additional support for the reflector assembly relative to the spoke of the bicycle wheel.

In accordance with the present invention, reflector assembly 10 includes means for positively and directly attaching the reflector 20 to one of the spokes of a bicycle wheel. As best shown in FIGS. 2 through 4, such means generally comprise a fastener 50 and a binding screw 60 which are adapted to be inserted within the center apertures 35 and 40 of the reflector 20 from opposite sides thereof and engaged relative to each other in such a manner as to positively secure the reflector 20 to the spoke of a bicycle wheel.

Although the reflector shown is preferably adapted to be positively attached to a single spoke and wedged between the two immediately adjacent neighboring spokes, it will be understood that the reflector fastener apparatus may be employed to attach reflectors to a spoke which do not require support by adjacent spokes.

The fastener 50 includes an axially extending bifurcated shank portion 51 and an enlarged, substantially rounded head 52 having a flattened peripheral side edge portion 53. The bifurcated shank portion 51 includes an internally threaded aperture or bore 54 extending axially through the center of said shank portion 51 from the free or distal end of the shank portion toward the head 52. The bifurcated shank 51 includes a pair of opposed axially extending slots 55 which extend from the distal end of the shank portion 51 toward the head 52 and terminate respectively in an arcuate shaped spoke receiving groove 56 transversely extending along the underside of the head 52. The opposed, axially extending slots 55 and the internally threaded bore 54 forms an axially transverse opening which is adapted to receive a bicycle spoke and the latter, in turn, is adapted to be positively retained within the arcuate shaped groove 56 as will be more fully explained below.

As best shown in FIG. 4, a plurality of axially spaced circumferentially extending rib portions 58 are disposed about the extent of the shank portion 51, the rib portions 58 each being axially tapered inwardly from the head 52, that is, from a larger diameter to a smaller diameter approximately equal to the diameter of the shank portion 51. The diameter of the larger diametered portion of rib portions 58 is generally slightly greater than the diameter of the smaller diametered portion of the tapered portion 37 of the center aperture 35. In this manner, it will be appreciated that while fastener 50 may be easily inserted into the center aperture 35, its removal is impeded by engagement of the larger diameter portions of the rib portions 58 against the annular lip 42 at the juncture of the center apertures 35 and 40 of members 21 and 22 of the reflector 20. Alternatively, the center aperture 35 may be non-tapered and have its diameter made to be slightly less than the maximum diameter of rib portions 58 in which event the extremities of the rib portions will tend to dig into the relatively soft plastic material of the reflector member 21, thus further impeding removal of fastener element once it has been inserted into the reflector assembly through center apertures 35, 40.

As shown in FIGS. 2 and 3, a binding screw 60 is provided which is adapted to be inserted into aperture 40 from the side of the reflector assembly defined by the outer surface 24 of reflector member 22 so as to mate with and engage the fastener 50. The binding screw 60 includes an enlarged head 61, preferably rounded, having one or more of the usual slots 62 for receiving a screwdriver blade and thus facilitating installation or removal of the binding screw 60. If desired, the slot or slots 62 may be of a tamperproof configuration such as, for example, having a configuration which provides sufficient purchase for installation with a screw-driver blade however failing to provide sufficient purchase for removal via the same or similar tool.

The binding screw 60 further includes an externally threaded shank portion 63 extending axially from the head 61 and terminating in a substantially flat bearing end portion 64. The axial length of the externally threaded shank portion 63 of the binding screw 60 preferably is approximately equal to the axial length of the internally threaded bore portion 54 of the fastener 50.

It will be appreciated that the externally threaded shank portion 63 of the binding screw 60 is adapted to threadably engage the internally threaded bore portion 54 of the fastener 50. In this manner, when a spoke 70 of a bicycle wheel is received within the opposed slots 55 of the fastener 50 and the externally threaded shank portion 63 of the screw 60 is threadably engage with the internally threaded portion 54 of the fastener, the spoke 70 will be relatively displaced axially along and within the slots 55 until the bearing end portion 64 of the binding screw urges the spoke into the arcuate shaped groove 56 of the fastener 50 thus positively securing the reflector assembly to the spoke 70. Further tightening of the binding screw 60 relative to the fastener element 50 causes the underside of the enlarged head 52 and of the enlarged head 61 to bear, respectively, upon the clamping surfaces provided by counterbore portion 36 and the outer surface 45 of boss 44, thus further aiding to positively secure the reflector assembly to the spoke 70.

During installation, the reflector 20 may be mounted onto the spoke of a bicycle wheel by positioning the reflector such that the spoke is received within the groove 30 on the outer surface 23 of the reflector member 21. The fastener element 50 is then aligned relative to the spoke such that the slots 55 are axially aligned with the spoke and the bifurcated shank 51 is inserted into the center aperture 35 of the reflector member 21 until the spoke is seated within the arcuate groove 56. From the opposite outer surface 24 of reflector member 22, the externally threaded shank 63 of the binding screw 60 is inserted into the aperture 40 and is threadably engaged with the internally threaded portion 54 of the fastener 50 as described above. By virtue of the angular dispositions of the groove 30 and the central apertures 35, 40, described above, the light receiving surfaces 23, 24 of the reflector 20 will be maintained substantially coincident or, at least, parallel to the plane of rotation of the bicycle wheel upon which the reflector is mounted.

It will be appreciated that the presence of the circumferentially extending rib portions 58 about the external circumference of shank 51 of the fastener 50 and the annular lip or shoulder 42 at the juncture of center apertures 35 and 40 insure that should the binding screw 60 become disengaged from the fastener 50, the reflector 20 will still be secured to the wheel since the fastener 50 is essentially blocked into place due to the engagement of its rib portions 58 against the lip 42 between the apertures 35 and 40. Consequently, in the event that the binding screw 60 is lost, the reflector 20 would still be secured to the spoke 70.

Having thus described the invention with particular reference to the preferred forms thereof, it will be obvious that various changes and modifications may be made therein without departing from the spirit and scope of the invention as defined in the appended claims.

Wherefore I claim:

1. Apparatus comprising:
   a. a member adapted to be mounted to the spoke of a wheel, said member having a portion defining an outer surface, an opening in said member extending through said member and said outer surface;
   b. a fastener element having a head and a shank;
   c. said shank being bifurcated and extending axially from said head, said shank being adapted to be disposed in said opening in said member with said head of said element engaging said member;
   d. said bifurcated shank defining an axially extending transverse opening in said element adapted to receive said spoke of said wheel; and
   e. means for locking said spoke, said element and said member together when said spoke is received within said opening positioned between said head and said outer surface is said member, wherein said member further comprises a groove in said outer surface intercepting said opening, said groove being adapted to receive said spoke and retain said member relative to said spoke, wherein said member comprises a reflector member, said reflector member having a pair of opposed light-receiving sides, one of said sides including said outer surface, and said groove is disposed in said one of said sides and extends transversely of said reflector member for receiving said spoke.

2. The invention of claim 1 wherein said opening has an axis substantially perpendicular to the base of said groove, and the base of said groove and said axis are inclined at an angle relative to said surface.

3. The assembly of claim 1 wherein said locking means comprises at least one circumferentially extending rib on the external surface of said shank, said rib being tapered from a larger diameter to a smaller diameter and being adapted to permit introduction of the shank of said fastener element into said opening from said one side of the reflector and to impede removal of said fastener element from said opening by engaging a lip disposed within said opening in said member.

4. The assembly of claim 1 wherein the depth of said groove on said one side of the reflector is tapered from said one end to said opposite end.

5. The assembly of claim 4 wherein said opening has a counterbore portion on said one side of the reflector, said counterbore portion having a diameter greater than the diameter of said opening, the depth of said counterbore portion being tapered in the direction of the taper of said groove.

6. The assembly of claim 5 wherein said opening includes a raised shoulder portion on said opposite side of said reflector about said opening, the height of said raised shoulder portion being tapered in the direction of the taper of said groove.

7. Apparatus comprising:
a. a reflector member adapted to be mounted to the spoke of a wheel, said reflector member having a portion defining a surface, means defining an opening in said member extending through said member and said surface;
b. a fastener element having a head and a shank;
c. said shank being bifurcated and extending axially from said head, said shank being adapted to be disposed in said opening in said member with said head of said element engaging said member;
d. said bifurcated shank defining an axially extending transverse opening in said element adapted to receive said spoke of said wheel; and
e. means for locking said spoke, said element, and said member together when said spoke is received within said opening positioned between said head and said surface of said member, wherein said means for locking comprises means disposed on an external surface of said shank engageable with said member within said opening for preventing axial withdrawal of said shank from said opening in said member, and wherein said opening comprises an annular lip disposed in said opening, said means for locking being adapted to engage said lip and prevent axial withdrawal of said shank from said opening in said member.

8. The apparatus of claim 7 wherein said means for preventing axial withdrawal comprises at least one circumferentially extending rib on an external surface of said fastener element shank, said rib adapted to engage said member within said opening.

9. The apparatus of claim 7 wherein said means for locking further includes an internally threaded bore portion axially disposed in said shank and a binding screw element having an externally threaded axially extending shank portion engageable therewith.

10. The invention of claim 7 wherein said opening comprises a first bore portion and a second bore portion, said first bore portion being inwardly tapered to define an annular lip at the juncture of said first and second bore portions, said means for locking comprising at least one circumferentially extending rib on the external surface of said fastener element shank, said rib being adapted to engage said annular lip and prevent axial withdrawal of said shank from said opening in said member.

11. The invention of claim 7, wherein said reflector member includes a plurality of retroreflective elements.

12. The apparatus of claim 7 wherein at least a portion of said opening is tapered to form said annular lip.

* * * * *